United States Patent [19]

McGrath et al.

[11] Patent Number: 5,079,333

[45] Date of Patent: Jan. 7, 1992

[54] NOVEL MINE-TERMINATED POLY(ARYLENE ETHER PHOSPHINE OXIDE) OLIGOMER

[75] Inventors: James E. McGrath; Carrington D. Smith, both of Blacksburg, Va.

[73] Assignee: Virginia Tech Intellectual Properties, Inc., Blacksburg, Va.

[21] Appl. No.: 552,635

[22] Filed: Jul. 13, 1990

[51] Int. Cl.$^5$ .............................................. C08G 79/02
[52] U.S. Cl. ................................... 528/168; 528/167; 528/169
[58] Field of Search ............ 528/169, 167, 168

[56] References Cited

U.S. PATENT DOCUMENTS 4,696,993  9/1987  Ude et al. ............................ 528/169

FOREIGN PATENT DOCUMENTS 3700208  7/1988  Fed. Rep. of Germany ...... 528/169

*Primary Examiner*—Harold D. Anderson
*Attorney, Agent, or Firm*—Richard P. Fennelly; Louis A. Morris

[57] ABSTRACT

Amine-terminated poly(arylene ether phosphine oxide) oligomers of the general formula

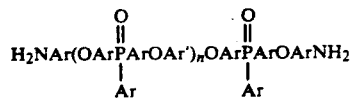

where Ar' is phenyl, biphenyl, bisphenol-A, etc., can be formed by reaction of a bisphenol monomer, a dihalo triphenyl phosphine oxide monomer, and an aminophenol.

7 Claims, No Drawings

NOVEL MINE-TERMINATED POLY(ARYLENE ETHER PHOSPHINE OXIDE) OLIGOMER

BACKGROUND OF THE INVENTION

The present invention relates to certain amine-terminated poly(arylene ether phosphine oxide) oligomers of the general formula

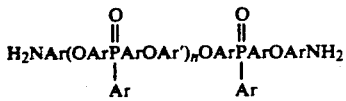

where Ar' represents phenyl, biphenyl, bisphenol-A, etc., n is an integer of from about 1 to about 50, and $NH_2$ can be in the meta position. These materials can serve as useful oligomeric intermediates to introduce the poly(arylene ether phosphine oxide) group into polymeric structures by appropriate reaction of the amine functionality (e.g., in toughened epoxies or bismaleimides or as intermediates for segmented copolymers). One potential application is to react the amine functionality with 3-isocyanatopropyltriethoxy silane to form a triethoxysilane end-capped material which can be reacted with a metal alkoxide (e.g., titanium isopropoxide), using sol-gel chemistry as described in U.S. Ser. No. 552,634 entitled "High Refractive-Index Hybrid Material Prepared By Titanium Alkoxide And A Phosphine Containing Oligomer" filed on even date herewith to form hybrid inorganic/organic materials (also termed "ceramers") which are useful as coatings or in optical systems.

The oligomers of the present invention can be readily formed by the nucleophilic aromatic substitution step polymerization of a bisphenol monomer, a dihalo triphenyl phosphine oxide monomer, and an aminophenol using polymerization techniques known to persons of ordinary skill in the art. The amount of bisphenol and triphenyl phosphine oxide should predominate to insure the formation of repeat units containing such moieties with the aminophenol end-capping the oligomeric structure. Thus, the value of the repeat unit "n" in the oligomer is inversely related to the concentration of aminophenol used.

A representative Example showing synthesis of the amine-terminated poly(arylene ether phosphine oxide) oligomers of the instant invention is as follows:

EXAMPLE

An amine-terminated poly(arylene ether phosphine oxide) oligomer, having a number average of around 15,000 was synthesized by charging a reaction flask with 10 gm (0.03182 mole) of bis(4-fluorophenyl) phenyl phosphine oxide, 5.746 gm (0.03086 mole) of 4,4'-biphenol, and 0.2128 gm (0.00195 mole) of m-aminophenol with dissolving in 105 ml of N-methylpyrrolidone. Powdered potassium carbonate was added to the solution followed by 55 ml of toluene. System dehydration was achieved by refluxing at 155° C. for four hours with removal of the water in a toluene azeotrope. The toluene was removed from the reaction, and the temperature was raised to 170° C. for sixteen hours. After cooling to 80° C., the reaction mixture was filtered to remove inorganic salts and was coagulated in a methanol/water solution. The oligomer was collected by filtration, was washed with methanol and was dried under vacuum. It was then redissolved, refiltered, reprecipitated in methanol, and redried. It had a Tg of 218° C. and an inherent viscosity in $CH_2Cl_2$ at 25° C. of 0.417.

We claim:

1. An amine-terminated poly(arylene ether phosphine oxide) oligomer formed by polymerization of a bisphenol monomer, a dihalo triphenyl phosphine oxide monomer, and an aminophenol.
2. An oligomer as claimed in claim 1 wherein the bisphenol is 4,4'-biphenol.
3. An oligomer as claimed in claim 1 wherein the phosphine oxide monomer is bis(4-fluorophenyl) phenyl phosphine oxide.
4. An oligomer as claimed in claim 2 wherein the phosphine oxide monomer is bis(4-fluorophenyl) phenyl phosphine oxide.
5. An oligomer as claimed in claim 1 wherein the aminophenol is m-aminophenol.
6. An oligomer as claimed in claim 2 wherein the aminophenol is m-aminophenol.
7. An oligomer as claimed in claim 3 wherein the aminophenol is m-aminophenol.